United States Patent
Baba

(10) Patent No.: US 9,625,801 B2
(45) Date of Patent: Apr. 18, 2017

(54) PROJECTION-TYPE DISPLAY APPARATUS

(71) Applicant: FUJIFILM Corporation, Tokyo (JP)

(72) Inventor: Tomoyuki Baba, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

(21) Appl. No.: 14/660,957

(22) Filed: Mar. 18, 2015

(65) Prior Publication Data
US 2015/0268545 A1  Sep. 24, 2015

(30) Foreign Application Priority Data

Mar. 20, 2014 (JP) .................... 2014-057762

(51) Int. Cl.
*G03B 21/20* (2006.01)
*G03B 21/00* (2006.01)

(52) U.S. Cl.
CPC ....... *G03B 21/2066* (2013.01); *G03B 21/008* (2013.01); *G03B 21/208* (2013.01)

(58) Field of Classification Search
CPC ... G03B 21/28; G03B 21/208; G03B 21/2066
See application file for complete search history.

(56) References Cited

U.S. PATENT DOCUMENTS

| | | | |
|---|---|---|---|
| 7,204,613 B2 | 4/2007 | Fushimi et al. | |
| 2004/0141157 A1* | 7/2004 | Ramachandran | G02B 17/06 353/70 |
| 2004/0165156 A1* | 8/2004 | Akiyama | G02B 26/008 353/84 |
| 2004/0207769 A1* | 10/2004 | Lin | H04N 9/315 349/5 |
| 2006/0055907 A1* | 3/2006 | Kato | G02B 13/143 355/67 |
| 2009/0103060 A1* | 4/2009 | Hirata | G02F 1/13471 353/122 |
| 2010/0128234 A1* | 5/2010 | Nishikawa | H04N 9/3105 353/98 |
| 2014/0268073 A1* | 9/2014 | Takano | G02B 13/0065 353/99 |

FOREIGN PATENT DOCUMENTS

| | | |
|---|---|---|
| JP | 4159840 | 10/2008 |
| JP | 4599391 | 12/2010 |

* cited by examiner

*Primary Examiner* — Sultan Chowdhury
(74) *Attorney, Agent, or Firm* — Young & Thompson

(57) ABSTRACT

A projection-type display apparatus includes a light source unit, a first optical system that rays from the light source unit enter, a second optical system that rays from the first optical system enter, an image display device that rays from the second optical system enter, and a projection lens that magnifies and projects an optical image formed by rays that have been optically modulated by the image display device onto a screen. The second optical system is configured to pass again the rays that have been output from the image display device, and to make the rays enter the projection lens. The first optical system includes at least one reflective optical element, and the second optical element consists essentially of two positive lenses.

8 Claims, 2 Drawing Sheets

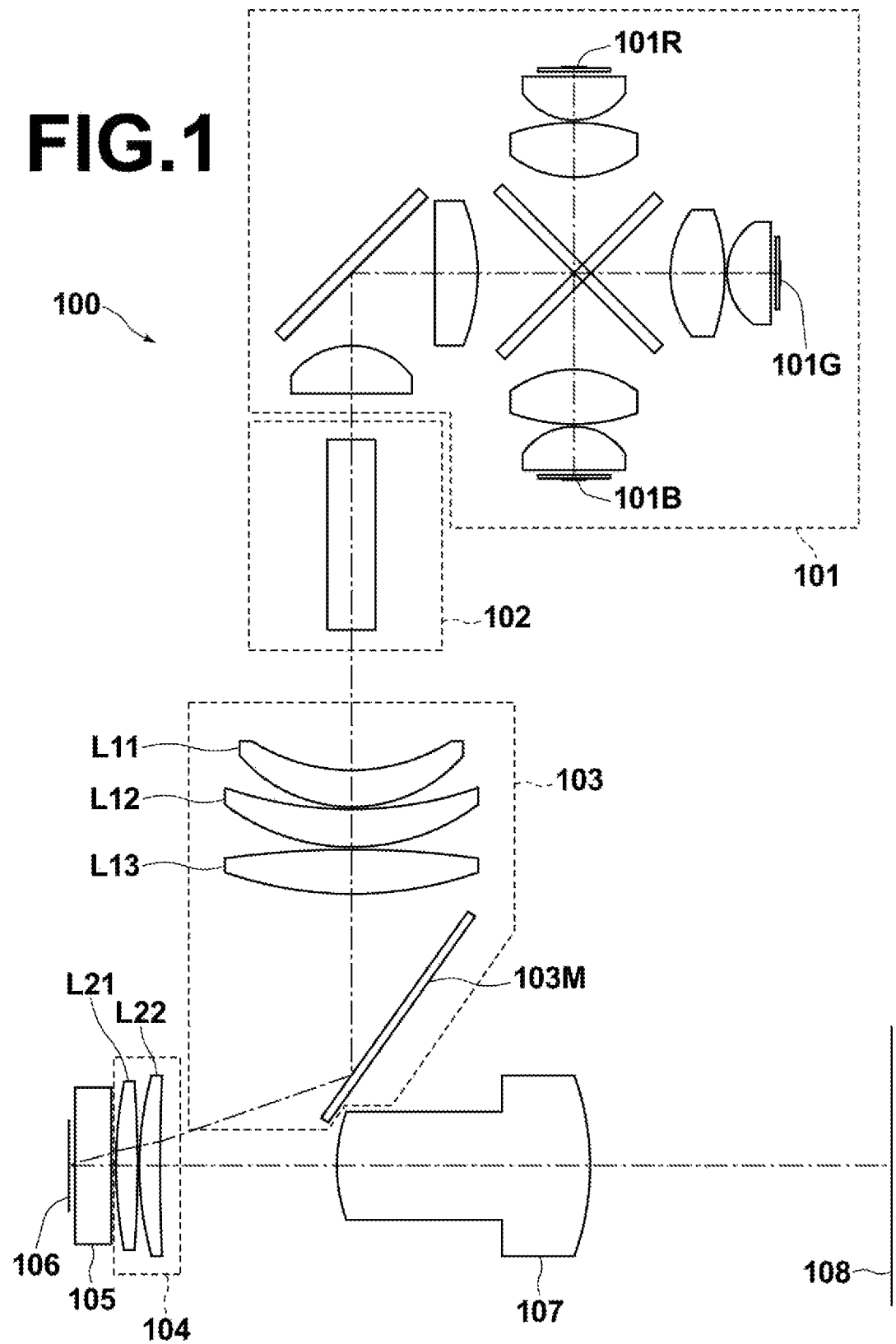

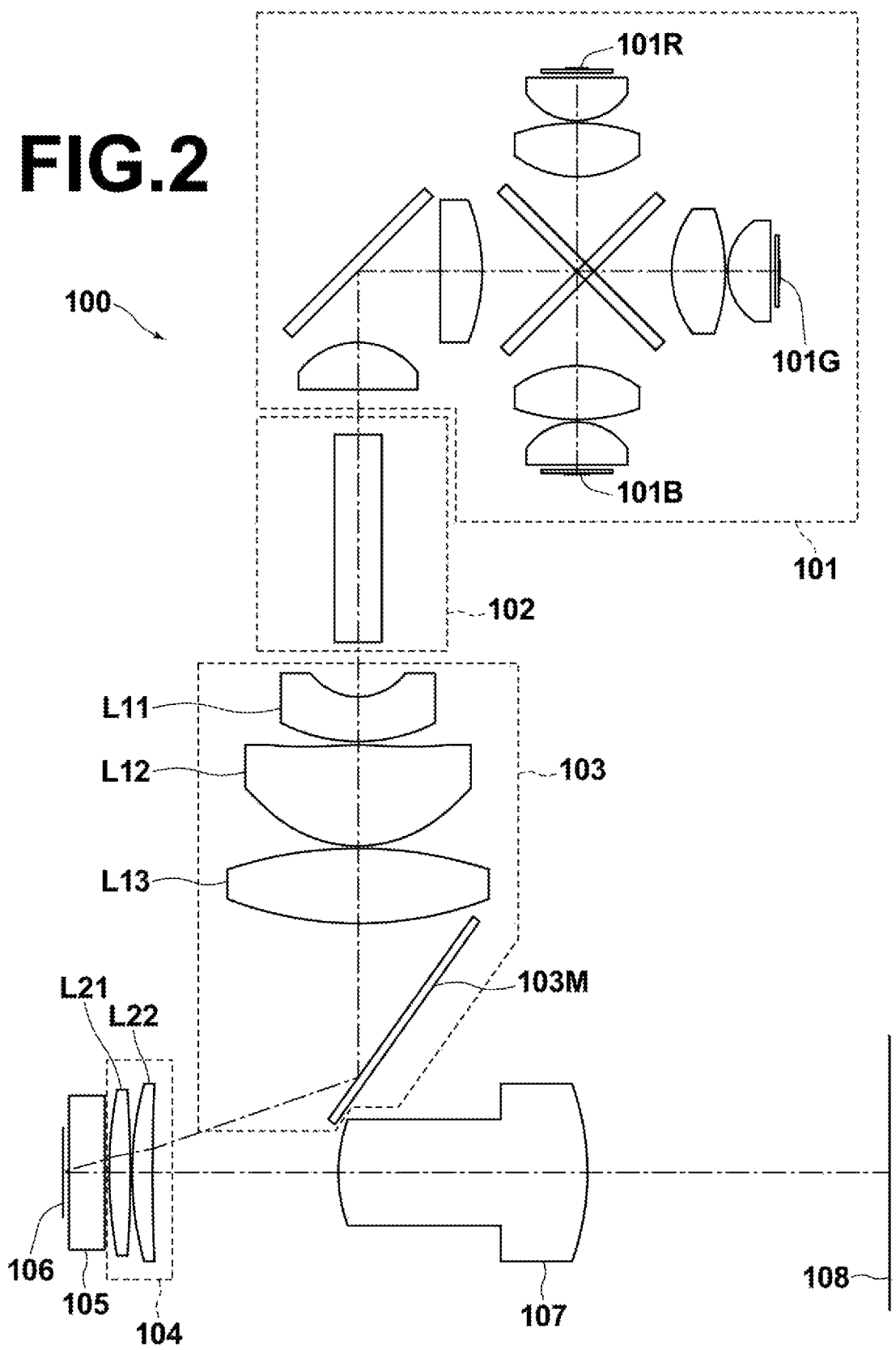

PROJECTION-TYPE DISPLAY APPARATUS

CROSS-REFERENCE TO RELATED APPLICATIONS

The present application claims priority under 35 U.S.C. §119 to Japanese Patent Application No. 2014-057762, filed on Mar. 20, 2014. The above application is hereby expressly incorporated by reference, in its entirety, into the present application.

BACKGROUND OF THE INVENTION

Field of the Invention

The present invention relates to a projection-type display apparatus using a reflective light valve, especially, a DMD in which micromirrors are arranged to perform modulation by deflection of light by the micromirrors.

Description of the Related Art

In recent years, a market of projectors greatly expanded as personal computers became widely used. As light valves (image display devices) used in these projectors, transmissive or reflective liquid crystal display devices, a DMD (Digital Micromirror Device) device, in which micromirrors are regularly arranged, and the like are known. Especially, the DMD device using micromirrors is appropriate to reduce the size of a projector, because the DMD device has a high response speed, and the projector is structurable in such a manner that illumination light of each of RGB is sequentially output to a single-panel light valve by time division.

In projectors, basically three types of optical system using a DMD device, as a light valve, are known. The first type separates rays of illumination light and rays of projection light from each other by using a total reflection prism. However, since the total reflection prism is used, there is a problem that the size of the apparatus becomes large, and the cost increases. In the second type, an entrance pupil is positioned toward the reduction side in a projection lens, and rays of illumination light and rays of projection light are separated from each other by greatly shifting the projection lens with respect to a light valve. However, since separation of rays of illumination light and rays of projection light is imperfect, illumination becomes uneven. Further, there is a problem that a pupil toward the magnification side is not positioned symmetrically with respect to the center of a projection image.

Therefore, when the size of a projector is tried to be reduced, the third type is desirable. In the third type, illumination light and projection light are separated from each other by arranging a field lens in the vicinity of a light valve. As projection-type display apparatuses configured in this manner, apparatuses disclosed in Specification of Japanese Patent No. 4159840 (Patent Document 1), Specification of Japanese Patent No. 4599391 (Patent Document 2) and Specification of U.S. Pat. No. 7,204,613 (Patent Document 3) are known.

SUMMARY OF THE INVENTION

Meanwhile, the type of separating rays of illumination light and rays of projection light from each other by a field lens has a problem that stray light by the field lens is generated, and also a problem that reduction in size is difficult, because the focal length of the field lens must be long as curvature of field occurs if the focal length of the field lens is reduced.

However, in all of the projection-type display apparatuses disclosed in Patent Documents 1 through 3, neither measures against stray light nor measures for reducing the size of an apparatus while also considering separation of rays of illumination light and rays of projection light from each other are proposed.

In view of the foregoing circumstances, it is an object of the present invention to provide a projection-type display apparatus in which stray light is small while the size of the apparatus is small.

A projection-type display apparatus of the present invention includes a light source unit, a first optical system that rays from the light source unit enter, a second optical system that rays from the first optical system enter, an image display device that rays from the second optical system enter and a projection lens that magnifies and projects an optical image formed by rays that have been optically modulated by the image display device onto a screen. The second optical system is configured to pass again the rays that have been output from the image display device, and to make the rays enter the projection lens. Further, the first optical system includes at least one reflective optical element, and the second optical element consists essentially of two positive lenses.

In the projection-type display apparatus of the present invention, it is desirable that a surface closest to the projection lens in the second optical system is concave.

Further, it is desirable that the reflective optical element or elements are a flat surface mirror or mirrors.

Further, it is desirable that the first optical system consists essentially of a negative lens, a positive lens and a positive lens, as optical elements having refractive power, in this order from a direction of the light source unit.

Further, it is desirable that the projection-type display apparatus includes, between the light source unit and the first optical system, an integrator unit that makes the distribution of the light amount of rays output from the light source unit uniform at a cross section perpendicular to an optical axis.

Here, the expression "consists essentially of" means that lenses essentially without any refractive power, optical elements, such as a stop, a mask, a cover glass and a filter, other than lenses, mechanical parts, such as a lens flange, a lens barrel, an imaging device and a hand shake blur correction mechanism, and the like may be included besides the elements mentioned as composition elements.

Further, the surface shape of the lenses and the sign of refractive power are considered in a paraxial region when an aspheric surface is included.

A projection-type display apparatus of the present invention includes a light source unit, a first optical system that rays from the light source unit enter, a second optical system that rays from the first optical system enter, an image display device that rays from the second optical system enter and a projection lens that magnifies and projects an optical image formed by rays that have been optically modulated by the image display device onto a screen. The second optical system is configured to pass again the rays that have been output from the image display device, and to make the rays enter the projection lens. Further, the first optical system includes at least one reflective optical element, and the second optical element consists essentially of two positive lenses. Therefore, it is possible to provide a projection-type display apparatus in which stray light is small while the size of the apparatus is small.

BRIEF DESCRIPTION OF THE DRAWINGS

FIG. 1 is a diagram illustrating the configuration of a projection-type display apparatus according to an embodiment of the present invention (also Example 1); and FIG. 2 is a diagram illustrating the configuration of a projection-type display apparatus in Example 2 of the present invention.

DESCRIPTION OF THE PREFERRED EMBODIMENTS

Next, embodiments of the present invention will be described in detail with reference to drawings. FIG. 1 is a diagram illustrating the configuration of a projection-type display apparatus according to an embodiment of the present invention. The example of configuration illustrated in FIG. 1 is also the configuration of a projection-type display apparatus in Example 1, which will be described later.

This projection-type display apparatus 100 includes a light source unit 101, an integrator unit 102 that makes the distribution of the light amount of rays output from the light source unit 101 uniform at a cross section perpendicular to an optical axis, a first optical system 103 that rays from the integrator unit 102 enter, a second optical system 104 that rays from the first optical system 103 enter, a DMD 106, as an image display device that rays from the second optical system 104 enter, a parallel-flat-plate-shaped optical member 105 that is assumed to be various filters, a cover glass or the like arranged toward the front side of the DMD 106, and a projection lens 107 that magnifies and projects an optical image formed by rays that have been optically modulated by the DMD 106 onto a screen. Further, the second optical system 104 is configured to pass again the rays that have been output from the DMD 106, and to make the rays enter the projection lens 107.

A flat surface mirror 103M, as a reflective optical element, is arranged closest to the second optical system 104 in the first optical system 103. When rays from the light source unit 101 are bent in this manner by using the flat surface mirror 103M, it is possible to arrange the first optical system 103 and the projection lens 107 in such a manner that they do not physically interfere with each other while an angle between rays of illumination light (rays entering the DMD 106) and rays of projection light (rays output from the DMD 106) is made small. Therefore, it is possible to reduce the size of the entire optical system.

Here, when the flat surface mirror is used as the reflective optical element, it is possible to reduce a length from the first optical system 103 to the second optical system 104, compared with a case of using other elements, such as a reflective prism. Therefore, it is possible to further reduce the size of the entire optical system. Further, when the flat surface mirror is used as the reflective optical element, it is possible to reduce cost and weight, compared with a case of using other elements, such as a reflective prism.

Further, the first optical system 103 is not limited to the aforementioned mode in which only one reflective optical element is arranged. An optical path may be bent by using plural reflective optical elements.

The second optical system 104, which functions as a field lens, consists of two positive lenses L21, L22. When the second optical system 104 consists of two positive lenses in this manner, it is possible to distribute positive refractive power to the lenses, compared with a case in which the second optical system 104 consists of only one positive lens. Therefore, it is possible to reduce curvature of field.

In the field lens, especially when a surface facing the projection lens 107 is a convex surface with strong refractive power, rays from the first optical system 103 may be reflected at this convex surface, and enter the projection lens 107, and become stray light. Therefore, when each of these lenses L21, L22 has positive refractive power, and a surface having a smaller absolute value of a curvature radius in each of lenses L21, L22 faces the reduction side (DMD 106 side), and the refractive power of the convex surface toward the projection lens 107 of each of the lenses is reduced, it is possible to reduce stray light.

In the second optical system 104, it is desirable that a surface closest to the projection lens 107 is concave. When the lens is configured in this manner, it is possible to further reduce stray light.

In the projection-type display apparatus 100 according to an embodiment of the present invention, it is desirable that the first optical system 103 consists of negative lens L11, positive lens L12 and positive lens L13, as optical elements having refractive power, in this order from a direction of the light source unit 101. Even if a distance between the integrator unit 102 and the first optical system 103 is reduced, when lens L11, which is closest to the light source unit 101 in the first optical system 103, is a negative lens, it is possible to make rays of illumination light (rays entering the DMD 106) in an excellent state by dispersing rays from the integrator unit 102 first, and by condensing the rays by positive lens L12 and positive lens L13 after then. Therefore, when the lenses in the first optical system 103 are arranged, as described above, it is possible to reduce a distance from the light source unit 101 to the first optical system 103. Hence, it is possible to reduce the size of the entire optical system.

When the focal length of the field lens is increased to suppress curvature of field, a distance between the first optical system 103 and the second optical system 104 becomes long. However, when the lens configuration of the first optical system 103 is a negative lens, a positive lens and a positive lens in this order from the light source unit 101, as described above, even if a distance between the first optical system 103 and the second optical system 104 becomes long, it is possible to make the distance between the integrator unit 102 and the first optical system 103 remain short. Therefore, it is possible to suppress an increase in the size of the entire optical system.

In this projection-type display apparatus 100, light of three primary colors (R, G, B) output from light sources 101R, 101G and 101B, respectively, is sequentially output from the light source unit 101 by time division. The distribution of the light amount of rays output from the light source unit 101 is made uniform at a cross section perpendicular to an optical axis by the integrator unit 102. Further, the rays are reflected by mirror 103M in the first optical system 103, and illuminate the DMD 106. At this time, light output from the first optical system 103 passes through the second optical system 104, which functions as a field lens of the projection lens 107, and enters the DMD 106. In the DMD 106, modulation is switched, based on a change in the color of incident light, to perform modulation for the color of incident light. The light that has been optically modulated by the DMD 106 passes through the second optical system 104, and enters the projection lens 107. The projection lens 107 projects an optical image of light that has been optically modulated by the DMD 106 onto a screen 108.

Here, other kinds of light valve may be used instead of the DMD 106. For example, a transmissive liquid crystal display device or a reflective liquid crystal display device may be used as the light valve.

Next, examples of the projection-type display apparatus of the present invention will be described. First, a projection-type display apparatus in Example 1 will be described. FIG. 1 is a diagram illustrating the configuration of the projection-type display apparatus in Example 1. Further, Table 1 shows lens data of a first optical system in the projection-type display apparatus in Example 1. Here, numerical values in Table 1 are normalized in such a manner that a focal length of the first optical system alone is 1.0. In the following descriptions, the meanings of signs in tables will be described by using the table of Example 1, as an example. The meanings of signs in tables of Example 2 are similar to those of Example 1.

In the lens data of Table 1, a column of surface number shows the surface number of a surface when a surface of composition elements closest to the light source unit is the first surface and the surface numbers sequentially increase toward the image side. A column of curvature radius shows the curvature radius of each surface. A column of surface distance shows a distance, on optical axis Z, between each surface and its next surface. Further, a column of nd shows the refractive index of each optical element for d-line (wavelength is 587.6 nm). A column of vd shows the Abbe number of each optical element for d-line (wavelength is 587.6 nm). Here, the sign of a curvature radius is positive when a surface shape is convex toward the object side, and negative when a surface shape is convex toward the image side.

TABLE 1

EXAMPLE 1·LENS DATA

| SURFACE NUMBER | CURVATURE RADIUS | SURFACE DISTANCE | nd | vd |
|---|---|---|---|---|
| OBJ | 0.0000 | 0.9576 | | |
| 1 | −1.2614 | 0.2499 | 1.83400 | 37.16 |
| 2 | −1.0048 | 0.0165 | | |
| 3 | −2.6141 | 0.2577 | 1.83400 | 37.16 |
| 4 | −1.4254 | 0.0165 | | |
| 5 | 6.2456 | 0.3026 | 1.83400 | 37.16 |
| 6 | −2.6055 | 3.7554 | | |
| IMG | ∞ | 0.0000 | | |

Next, a projection-type display apparatus in Example 2 will be described. FIG. 2 is a diagram illustrating the configuration of the projection-type display apparatus in Example 2. Further, Table 2 shows lens data of a first optical system in the projection-type display apparatus in Example 2, and Table 3 shows data about aspheric surface coefficients in Example 2. Here, numerical values in Tables 2 and 3 are normalized in such a manner that a focal length of the first optical system alone is 1.0.

In the lens data of Table 2, mark "*" is attached to the surface numbers of aspheric surfaces. Further, a numerical value of a paraxial curvature radius is used as the curvature radius of an aspheric surface. The data about aspheric surface coefficients in Table 3 show surface numbers of aspheric surfaces and aspheric surface coefficients about the aspheric surfaces. The aspheric surface coefficients are values of coefficients KA, Am (m=4, 6, . . . 12) in an aspheric surface equation represented by the following equation:

$$Zd = C \cdot h^2 / \{1 + (1 - KA \cdot C^2 \cdot h^2)^{1/2}\} + \Sigma Am \cdot h^m, \text{ where}$$

Zd: the depth of an aspheric surface (the length of a perpendicular from a point on the aspheric surface at height h to a flat plane that contacts with the vertex of the aspheric surface and is perpendicular to the optical axis), h: height (a length from the optical axis), C: a reciprocal of a paraxial curvature radius, and KA, Am: aspheric surface coefficients (m=4, 6 . . . 12).

TABLE 2

EXAMPLE 2·LENS DATA

| SURFACE NUMBER | CURVATURE RADIUS | SURFACE DISTANCE | nd | vd |
|---|---|---|---|---|
| OBJ | 0.0000 | 0.4682 | | |
| 1 | −0.5065 | 0.3820 | 1.83400 | 37.16 |
| 2 | −1.4518 | 0.0322 | | |
| *3 | 3.4677 | 0.8618 | 1.52400 | 55.20 |
| *4 | −1.0890 | 0.0203 | | |
| 5 | 3.5470 | 0.6415 | 1.83400 | 37.16 |
| 6 | −3.0897 | 4.2850 | | |
| IMG | ∞ | 0.0000 | | |

TABLE 3

EXAMPLE 2·ASPHERIC SURFACE COEFFICIENT

| | SURFACE NUMBER | |
|---|---|---|
| | 3 | 4 |
| KA | 1.5806476E+01 | 2.1792783E−01 |
| A4 | −5.1114209E−01 | −6.3461099E−02 |
| A6 | 2.5864930E−01 | −2.5807973E−02 |
| A8 | 2.7929223E−01 | −6.8756196E−03 |
| A10 | 4.6529357E−02 | −4.7073356E−03 |
| A12 | −7.3192935E−01 | 5.7396650E−02 |

So far, the present invention has been described by using embodiments and examples. However, the present invention is not limited to the aforementioned embodiments nor examples, and various modifications are possible. For example, the values of a curvature radius, a distance between surfaces, a refractive index and an Abbe number of each lens element are not limited to the values in the aforementioned numerical value examples, and may be other values.

Further, the projection-type display apparatus of the present invention is not limited to the apparatus configured as described above. For example, the light valve used in the apparatus and an optical member used to separate rays or combine rays are not limited to the aforementioned configuration, and various modifications of the mode are possible.

What is claimed is:

1. A projection display apparatus comprising:
   a light source unit;
   a first optical system that rays from the light source unit enter;
   a second optical system that rays from the first optical system enter;
   an image display device that rays from the second optical system enter; and
   a projection lens that magnifies and projects an optical image formed by rays that have been optically modulated by the image display device onto a screen,
   wherein the second optical system is configured to pass again the rays that have been output from the image display device, and to make the rays enter the projection lens,
   wherein the first optical system includes at least one reflective optical element,
   wherein the second optical element consists essentially of two positive lenses, and
   wherein a surface closest to the projection lens in the second optical system is concave.

2. The projection display apparatus, as defined in claim 1, wherein the at least one reflective optical element is a flat surface mirror.

3. The projection display apparatus, as defined in claim 1, wherein the first optical system consists essentially of a negative lens, a positive lens and a positive lens, as optical elements having refractive power, in this order from a direction of the light source unit.

4. The projection display apparatus, as defined in claim 2, wherein the first optical system consists essentially of a negative lens, a positive lens and a positive lens, as optical elements having refractive power, in this order from a direction of the light source unit.

5. The projection display appartus, as defined in claim 1, the apparatus comprising:
   an integrator unit, between the light source unit and the first optical system, that makes the distribution of the light amount of rays output from the light source unit uniform at a cross section perpendicular to an optical axis.

6. The projection display apparatus, as defined in claim 2, the apparatus comprising:
   an integrator unit, between the light source unit and the first optical system, that makes the distribution of the light amount of rays output from the light source unit uniform at a cross section perpendicular to an optical axis.

7. The projection display apparatus, as defined in claim 3, the apparatus comprising:
   an integrator unit, between the light source unit and the first optical system, that makes the distribution of the light amount of rays output from the light source unit uniform at a cross section perpendicular to an optical axis.

8. The projection display apparatus, as defined in claim 4, the apparatus comprising:
   an integrator unit, between the light source unit and the first optical system, that makes the distribution of the light amount of rays output from the light source unit uniform at a cross section perpendicular to an optical axis.

\* \* \* \* \*